(12) United States Patent
Nishikawa

(10) Patent No.: US 6,277,930 B1
(45) Date of Patent: Aug. 21, 2001

(54) EPOXY RESIN COMPOSITION CONTAINING UNSATURATED MONOMER, CURING AGENT, PHOTOINITIATOR AND EPOXY (METH) ACRYLATE

(75) Inventor: Katsue Nishikawa, Yamato (JP)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/366,766

(22) Filed: Aug. 4, 1999

(51) Int. Cl.[7] ................ C08F 2/48; C08L 63/10
(52) U.S. Cl. .......... 525/526; 522/100; 522/103; 525/524
(58) Field of Search .................. 525/524, 526; 522/100, 103

(56) References Cited

U.S. PATENT DOCUMENTS

| | | | |
|---|---|---|---|
| 4,568,719 | * 2/1986 | Tada et al. | 525/524 |
| 5,055,378 | * 10/1991 | Miyamura et al. | 522/103 |
| 5,439,956 | 8/1995 | Nooguchi | 522/92 |
| 5,453,973 | 9/1995 | Nishio | 369/266 |
| 5,596,023 | 1/1997 | Tsubota et al. | 522/100 |
| 5,696,652 | 12/1997 | Satoh | 360/104 |

OTHER PUBLICATIONS

JP 1190779 (Derwent Abstract only), 7/89.
JP 5295087 (Derwent Abstract only), 11/93.
JP 8165459 (Derwent Abstract only), 6/96.
JP 61057909 (Derwent Abstract only), 3/86.

* cited by examiner

*Primary Examiner*—Robert E. L. Sellers
(74) *Attorney, Agent, or Firm*—Steven C. Bauman

(57) ABSTRACT

The present invention relates to an epoxy resin composition used for cap seal of a hard disc drive spindle motor, which hardly causes outgassing even when using in a hard disc for high-speed rotation and has high reliability. The composition comprises an epoxy resin having at least one glycidyl group in a molecule as a component (A), a monomer having at least one unsaturated bond group in a molecule (polyfunctional vinyl monomer or monofunctional vinyl monomer) as a component (B), an epoxy resin curing agent as a component (C), a photopolymerization initiator as a component (D), and a partially-esterified unsaturated epoxy resin wherein 10–90% of an epoxy equivalent of a bisphenol type epoxy resin is (meth)acrylated as a component (E).

8 Claims, 1 Drawing Sheet

EPOXY RESIN COMPOSITION CONTAINING UNSATURATED MONOMER, CURING AGENT, PHOTOINITIATOR AND EPOXY (METH) ACRYLATE

BACKGROUND OF THE INVENTION (i) Field of the Invention

The present invention relates to an epoxy resin and, more particularly, to an epoxy resin used for cap seal of a hard disc spindle motor.

(ii) Description of the Prior Art

With the increase of storage capacity in recent years, track density and linear density of hard disc drives have increased as well. Clean spindle motors that do not influence writing or reading of media discs have been sought for use with hard disc drive. For example, when a gas is evolved from constituent members of the spindle motor, the gas accumulates on a contact between a recording head and a recording media to cause a read error. Therefore, members with low outgassing potential have been sought as the respective members constituting the spindle motor.

The rotational speed of the hard disc drive has gradually become higher so as to improve the writing and reading rates of data. More specifically hard disc drives with rotational speeds of 5400 rpm has been replaced by those with rotational speeds of 7200 rpm, and further 10000 rpm. Accordingly, clean members constituting the spindle motor causing no change in chemical and physical properties at high rotational speed have been particularly sought.

FIG. 1 shows a typical construction (plan view) of a hard disc drive, which is composed of a spindle motor 10, a media disc 11 mounted to the spindle motor, a head 12 for writing and reading information on the media disc, an actuator arm 13 for supporting the head, a pivot 14 serving as a rotating shaft of the actuator arm, and a voice coil motor 15 for moving the actuator arm.

FIG. 2 is a schematic view of the spindle motor in which a portion is cut away to show a sectional view. The spindle motor 10 comprises a stator 30 as a fixed portion and a rotor 20 as a rotating portion. The stator 30 comprises a base 31, a shaft 32 and a stator coil 33, while the rotor 20 comprises a hub 21 mounted rotatably to the shaft 32 through a bearing 22, and a magnet 23 mounted to the hub, the magnet facing to the stator coil. In order to prevent powders, possibly produced by contact between the bearing and shaft, and bearing oil from directly scattering thereby to contaminate the media disc, a cap 26 is fixed on a top surface of the hub 21 to cover the bearing, using a cap sealant 27. The media disc 11, which is fixed to a fixture for mounting disc (not shown), is mounted to a flange surface 24 using a tap hole 25 for screwing.

As the cap sealant 27, for example, two-pack epoxy resin adhesive, UV cationic epoxy resin adhesive and thermosetting epoxy resin adhesive are commonly used. However, the two-pack epoxy resin adhesive is inferior in workability because it takes a long time for mixing before use. The UV cationic epoxy resin adhesive is difficult to cure at the non-irradiated portion, leaving insufficiently cured adhesive. The fluidity of the thermosetting epoxy resin adhesive increases with the increase of the temperature at the beginning of the curing, resulting in poor workability.

Therefore, a one-pack type UV theremosetting epoxy resin composition comprising an epoxy resin, an epoxy resin curing agent, an acrylic monomer and a photopolymerization initiator has recently been used. Consequently, it is possible to satisfy both of the workability and seal strength by coating an uncured resin around a cap, fixing by irradiating the resin with light to obtain a certain strength, and properly curing by heating.

However, it has been found that an epoxy resin adhesive of a conventional composition is not satisfactory as a cap sealant of a spindle motor for high-speed rotation, where a cleaner environment is required due to the increase of the rotational speed, e.g. 5400 rpm, 7200 rpm and 10000 rpm, because outgassing of low molecular materials occurs frequently at these higher rotational speed. According to the present inventor's study, the epoxy resin is not sufficiently cured and the uncured component may leach from within by an influence of vibration due to high-speed rotation.

In light of these problems, it would be desirable to provide a epoxy resin composition that was completed and, portions of which do not leach from within the cured adhesive.

SUMMARY OF THE INVENTION

The present invention provides an epoxy resin composition for spindle motor cap seal, which minimize outgassing even when using in a hard disc drive operating at such high-speed of rotation, and has high reliability.

More specifically, the present invention is directed to an epoxy resin composition used for cap seal of a hard disc drive spindle motor, comprising an epoxy resin having at least one glycidyl group in a molecule as a component (A), a monomer having at least one unsaturated bond group in a molecule (polyfunctional vinyl monomer or monofunctional vinyl monomer) as a component (B), an epoxy resin curing agent as a component (C), a photopolymerization initiator as a component (D), and a partially-esterified unsaturated epoxy resin wherein 10–90% of an epoxy equivalent of a bisphenol type epoxy resin is (meth)acrylated as a component (E).

The invention also provides methods of sealing a cap seal for a hard disc drive motor.

The invention further provides reaction products of the inventive epoxy resin composition.

DETAILED DESCRIPTION OF THE INVENTION

Figure 1:
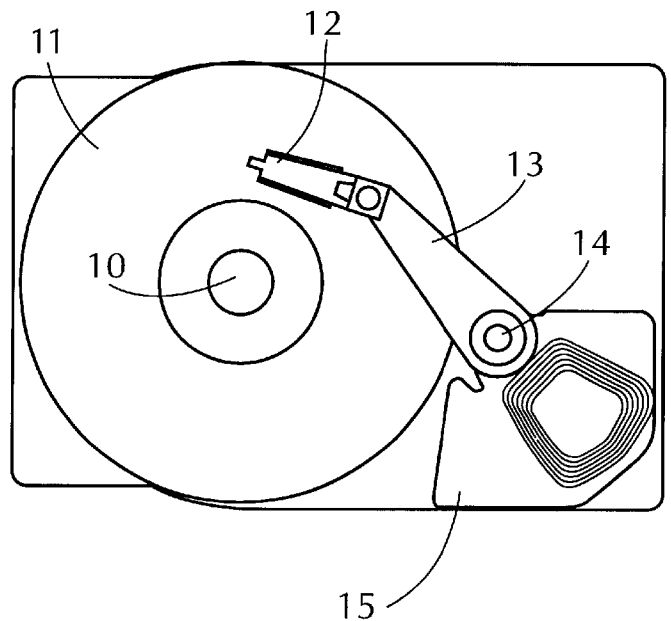
FIG. 1 is a plan view showing a hard disc.
Figure 2:
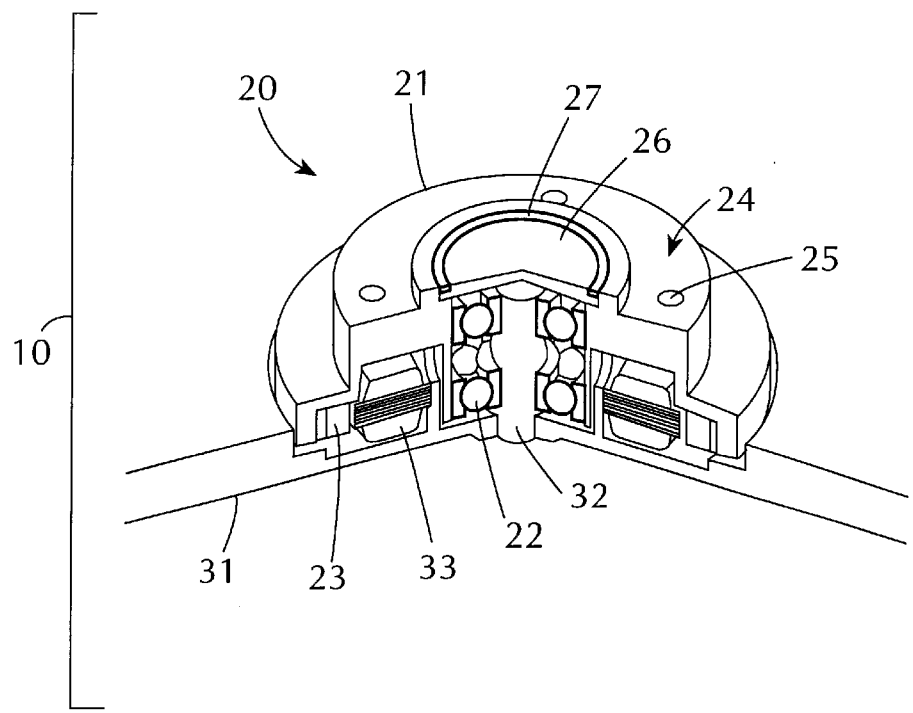
FIG. 2 is a partially cutaway perspective view showing spindle motor of the hard disc.

As described above, the epoxy resin composition of the present invention comprises the components (A) to (E).

As the component (A): an epoxy resin having at least one glycidyl group in a molecule contained in the composition of the present invention, a general epoxy resin can be used and it may be a polyfunctional epoxy resin (resin having two or more glycidyl groups in a molecule) or a monofunctional epoxy resin (resin having one glycidyl group in a molecule). Usually, it is preferred to use a polyfunctional epoxy resin. In combination with a polyfunctional epoxy resin, a monofunctional epoxy resin may be used in the amount of not more than 30% by weight, preferably not more than 20% by weight (in both cases % by weight bases on the whole epoxy resin of the component (A)).

Examples of the polyfunctional epoxy resin include bisphenol A type epoxy resin, bisphenol F type epoxy resin, phenol novolak type epoxy resin, cresol novolak type epoxy resin and the like. Two or more kinds of these epoxy resins may be used in combination.

In the present invention, a bisphenol type epoxy resin, which is liquid at room temperature, is preferably used as the epoxy resin of component (A), and a bisphenol A type epoxy resin is more preferably used.

In general, such a bisphenol A type epoxy resin is commercially available and specific trade name thereof include Epikote 825 and Epikote 828 (manufactured by Yuka Shell Co.; Araldite 250, Araldite 2500, Araldite 260 and Araldite 2600 (manufactured by Asahi Ciba Co.); DER 331J, DER 331P, DER 331L and DER 332 (manufactured by Dow Chemical Co.); YD 128 (manufactured by Toto Kasei Co.); and RE310 and RE410 (manufactured by Nippon Kayaku Co.).

As the component (B): a monomer having at least one unsaturated bond group in a molecule (polyfunctional vinyl monomer or monofunctional vinyl monomer) used in the present invention, a polyfunctional (meth)acrylate compound or a monofunctional (meth)acryate compound is preferred.

The component (B) of the present invention includes at least polyfunctional vinyl monomer or monomers and, if necessary, a monofunctional vinyl monomer or monomers may also be used in combination. The amount of the monofunctional vinyl monomer is preferably not more than 50% by weight (including 0%) based on the component (B).

Examples of the polyfunctional (meth) acrylate compound include difunctional (meth)acrylate compound such as ethylene glycol di(meth)acrylate, 1,4-butanediol di(meth)acrylate, triethylene glycol di(meth)acrylate, neopentyl glycol di(meth)acrylate, 1,6-hexanediol di(meth)acrylate and ethylene oxide modified bisphenol A di (meth) acrylate; and tri- or polyfunctional (meth) acrylate compound such as trimethylolpropane tri(meth)acrylate, pentaerythritol tri (meth)acrylate, pentaerythritol tetra (meth) acrylate, dipentaerythritol penta (meth) acrylate, dipentaerythritol hexa (meth)acrylate, penta(meth)acrylate of caprolactone modified dipentaerythritol and hexa(meth)acrylate of caprolactone modified dipentaerythritol. Among them, tri- or polyfunctional (meth)acrylate compounds are preferred. These polyfunctional (meth) acrylate compounds can be used alone or in combination.

Examples of the monofunctional (meth) acrylate compound include alkyl (meth) acrylate having 1 to 20 carbon atoms, such as methyl (meth)acrylate, ethyl (meth)acrylate, butyl (meth)acrylate, t-butyl (meth)acrylate, isodecyl (meth) acrylate, lauryl (meth)acrylate, tridecyl (meth)acrylate, stearyl (meth)acrylate and the like. These monofunctional (meth) acrylate compounds can be used alone or in combination thereof.

An epoxy resin curing agent is used as the component (C), a latent curing agent is preferred and examples thereof include those, which are solid at room temperature and are present in the form of powder in the composition, and which dissolves in the other components by heating on curing, thereby to exert its function as a curing agent. Since the spindle motor as an object is precision machinery, those capable of curing at the temperature where no strain occurs are used. Accordingly, the curing temperature is from 60 to 120° C., preferably from 70 to 110° C., and more preferably from 70 to about 100° C.

Specific examples thereof include modified polyamine such as epoxy compound added polyamine adduct wherein an amine compound is added to the epoxy compound, modified imidazole compound such as imidazole adduct wherein an imidazole compound is added to the epoxy compound and the like. Particularly, an imidazole adduct wherein an imidazole compound is added to the epoxy compound is preferred.

A photopolymerization initiator is used as the component (D), a photopolymerization initiator capable of penetrating the surface of the composition to cure through the volume of the seal is preferred.

Specific examples of the photopolymerization initiator used as the component (D) include 2-hydroxy-2-methyl-phenyl-propane-1-one, 2,2-dimethoxy-1,2-diphenylethane-1-on, 1-hydroxy-cyclohexyl-phenyl-ketone, methylbenzoilformate, 1,2-diphenylethanedione-2,4-diethylthioxantone, isopropylthioxantone and the like.

The component (E): "a partially-esterified unsaturated epoxy resin wherein 10–90% of an epoxy equivalent of a bisphenol type epoxy resin is (meth)acrylated" used in the present invention has a structure where a (meth) acryloyloxy group is added to a glycidyl group of a bisphenol type epoxy resin. Showing an example of a structure of only one molecule, a partially-esterified unsaturated epoxy resin (bisphenol A type) where one of two glycidyl groups is methacrylated is represented by the following formula (I):

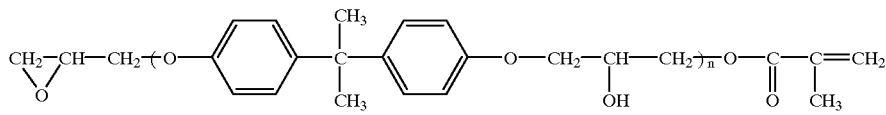

(I)

In this equation n is usually 1 to about 4.

The component (E) is a mixture containing such a molecule, where 10 to 90% of the total epoxy equivalents is (meth)acrylated. Accordingly, a molecule containing no (meth)acryloyloxy group, a molecule wherein a (meth) acryloyloxy group is added to one of two glycidyl groups and a molecule wherein a (meth) acryloyloxy group is added to both of two glycidyl groups are contained in the mixture constituting the component (E).

Examples of the bisphenol type epoxy resin where the (meth)acryloyloxy group is added include bisphenol A type epoxy resin, bisphenol F type epoxy resin and the like, but a general bisphenol A type epoxy resin maybe used. The epoxy equivalent of the bisphenol type epoxy resin, which is the compound before (meth)acryloyloxy group is added, is preferably from 50 to 500, and particularly preferably from about 100 to 300 (e.g. about 200).

The component (E) is preferably liquid or semi-solid (waxy) at room temperature.

Regarding to the amount of the respective components to be mixed in the composition of the present invention, the amount of the component (A) is usually from 50 to 80% by weight, and preferably from60to 70% by weight, based on 100% by weight of the total amount of the components (A) to (E). Similarly, the amount of the component (B) is usually more than 0% and not more than 30% by weight, and preferably from 5 to 25% by weight, based on 100% by weight of the total amount of the components (A) to (E). The amount of the component (C) is usually from 10 to 40 parts by weight, and preferably from 10 to 20 parts by weight, based on 100 parts by weight of the amount of two components (A) and (E). The amount of the component (D) is usually from 0.1 to 3% by weight, and preferably from 0.5 to 2% by weight, based on 100% by weight of the total amount of the components (A) to (E). The amount of the component (E) is usually from 5 to 25% by weight, and preferably from 5 to 15% by weight, based on 100% by weight of the total amount of the components (A) to (E).

The composition of the present invention may further contain colorants, organic or inorganic fillers, defoamers and leveling agents and the like, if desired.

It is preferred that the epoxy resin compound of the present invention is liquid in appearance and that the components (A) to (E) are uniformly mixed and a part of the components is preferably dispersed in the form of powder. The viscosity of the composition is from 1000 to 40,000 cps, and preferably from 5,000 to 30,000 cps. The viscosity can be adjusted by selecting the material of the respective components and adjusting a composition ratio while taking required characteristics into consideration.

As the method of applying the epoxy resin composition of the present invention to the cap for hard disc spindle motor, a conventional method may be used. For example, this epoxy resin composition is first coated around the cap in the thickness of about 1 mm using a dispenser or the like. Then the composition is irradiated with ultraviolet light at a dose of 10–4000 mJ/cm$^2$, which solidifies the composition as a result of a loss in fluidity. Thereafter, the solidified composition is cured by heating, for example, at about 100° C. for 10 minutes to 6 hours, and preferably from 30 minutes to 4 hours.

EXAMPLE

The components (A) to (E) shown in Table 1 were mixed to obtain an epoxy resin composition of the present invention.

TABLE 1

| Compo nent | | Comparative Ex.1 | Ex. 1 | Ex. 2 | Ex. 3 | Ex. 4 |
|---|---|---|---|---|---|---|
| (A) | Bis-phenol A epoxy | 65.35 | 55.35 | 55.35 | 55.35 | 65.35 |
| (B) | Vinyl-monomer (1) | 21.15 | 11.15 | 16.15 | 11.15 | 11.15 |
|  | TMPTA | 0 | 0 | 0 | 5 | 0 |
|  | Vinyl-monomer (3) | 0 | 10 | 5 | 0 | 0 |
| (C) | Epoxy-imdazole adducts | 12.8 | 12.8 | 12.8 | 12.8 | 12.8 |
| (D) | Photo-initiator (1) | 0.7 | 0.7 | 0.7 | 0.7 | 0.7 |
| (E) | Partially-methacrylated epoxy | 0 | 10 | 10 | 15 | 10 |

Vinyl-monomer (1): dipentaerythritol pentacrylate
TMPTA: trimethylolpropane triacrylate
Vinyl-monomer (3): hexaacrylate of caprolactone modified dipentaerythritol
Photo-initiator (1): 1-hydroxy-cyclohexyl-phenyl-ketone
Partially-methacrylated epoxy: About 50 wt % methacrylated bis-phenol A epoxy Using the epoxy resin compounds (Comparative Example 1, Examples 1 to 4) shown in Table 1, non-irradiated sample and samples irradiated with ultraviolet light at a dose of 50 mJ/cm$^2$, 100 mJ/cm$^2$ and 4000 mJ/cm$^2$ of the respective compositions were prepared and heated to 200° C., and then heat generation was observed by DSC. The results are shown in Table 2. The heat generated by heating to 200° C. is caused only by thermal cure of the epoxy resin. Polymerization of the vinyl monomer as the component (B) used is not promoted by heat. That is, when using the same composition, it is expected that a fixed amount of heat generation is exhibited regardless of the amount of light irradiation if the thermal cure proceeds completely. However, the amount of heat generated by the non-irradiated sample is 231 J/g while the amount of heat generated by the sample irradiated with ultraviolet light at an intensity of 100 mJ/cm$^2$ is reduced to 169 J/g in the case of Comparative Example 1 in Table 2. This means that the amount of the thermally cured epoxy resin is small in the sample irradiated with ultraviolet light, that is, the residual amount of the uncured epoxy resin is large.

To the contrary, in the epoxy resin compositions of the present invention (Examples 1 to 4), the amount of heat generation is not drastically reduced even if the amount of irradiation is increased in comparison with the non-irradiated sample. This means that the epoxy resin component of the present invention is sufficiently cured. While not wishing to be bound by theory, the present inventor considers that curing of a conventional composition proceeds too extensively by ultraviolet light irradiation and forms a three-dimensional network structure that inhibits the movement of the epoxy resin during thermal cure. On the other hand, in the composition of the present invention, the epoxy resin moves easily even in a state where the composition was solidified by light irradiation and, therefore, curing by heat proceeds sufficiently.

TABLE 2

| | Amount of heat generation (J/g) | | | | |
|---|---|---|---|---|---|
| Amount of irradiation (mJ/cm2) | Comparative Ex.1 | Ex. 1 | Ex. 2 | Ex. 3 | Ex. 4 |
| No irradiation | 231 | 232 | 219 | 240 | 276 |
| 50 | 193 | 238 | 248 | 245 | 286 |
| 100 | 169 | 217 | 216 | 230 | 259 |
| 4000 | 108 | 176 | 190 | 167 | 229 |

Using the composition of the present invention as a cap seal for a hard disc spindle motor, an endurance test of the hard disc drive was conducted under acceleration conditions. As a result, no defects were observed to occur.

It has been found that, when the epoxy resin composition of the present invention is used for cap seal of a spindle motor, outgassing hardly occurs even when used in a hard disc drive at high-speed rotation, and the epoxy resin composition has high reliability and excellent workability.

What is claimed is:

1. An epoxy resin composition used as a cap seal for a hard disc drive spindle motor, comprising the following components (A) to (E):

(A) an epoxy resin having at least two glycidyl groups in a molecule, in an amount within the range of from 50 to 80% by weight;

(B) a monomer having at least one unsaturated bond group in a molecule, in an amount of more than 0% to 30% by weight;

(C) an epoxy resin curing agent;

(D) a photopolymerization initiator, in an amount within the range of from 0.1 to 3% by weight; and (E) a partially-esterified unsaturated epoxy resin wherein 10–90% of an epoxy equivalent of a bisphenol epoxy resin is (meth)acrylated, in an amount within the range of from 5 to 25% by weight, the amounts of components (A), (B), (D) and (E) based on 100% by weight of the total amounts of components (A) to (E) wherein the amount of the epoxy resin curing agent is from 10 to 40 parts by weight, based on 100 parts by weight of the amount of the epoxy resin and the partially-esterified unsaturated epoxy resin.

2. The epoxy resin composition according to claim 1, wherein the component (A) is a bisphenol A epoxy resin which is liquid at room temperature.

3. The epoxy resin composition according to claim 1, wherein the component (C) is a latent curing agent for an epoxy resin.

4. The epoxy resin composition according to claim 3, wherein the latent curing agent is solid at room temperature and dissolves in the other components upon heating, thereby exerting its curing function.

5. The epoxy resin composition according to claim 1, wherein the component (B) comprises a polyfunctional (meth) acrylate compound.

6. The epoxy resin composition according to claim 1, wherein the bisphenol epoxy resin before (meth)acrylatation to give the partially-esterified unsaturated epoxy resin as component (E) is a bisphenol A epoxy resin.

7. The epoxy resin composition according to claim 1, wherein the epoxy equivalent of the bisphenol epoxy resin before (meth) acrylatation to give the partially-esterified unsaturated epoxy resin as component (E) is from 50 to 500.

8. The epoxy resin composition according to claim 1, wherein the viscosity of the composition is from 1000 to 40,000 cps.

* * * * *

UNITED STATES PATENT AND TRADEMARK OFFICE
CERTIFICATE OF CORRECTION

PATENT NO. : 6,277,930 B1
DATED : August 21, 2001
INVENTOR(S) : Nishikawa, K

It is certified that error appears in the above-identified patent and that said Letters Patent is hereby corrected as shown below:

<u>Column 4,</u>
Line 21, reads "phenyl-propane-1-one,". should read -- phenyl-propane-1-on, --.

Signed and Sealed this

Twenty-third Day of July, 2002

*Attest:*

*Attesting Officer*

JAMES E. ROGAN
*Director of the United States Patent and Trademark Office*